US007099000B2

(12) United States Patent  (10) Patent No.: US 7,099,000 B2
Connolly  (45) Date of Patent: Aug. 29, 2006

(54) LASER LEVELING APPARATUS

(76) Inventor: Michael Connolly, 24 Grenfell Street, Kent Town, South Australia 5067 (AU)

( * ) Notice: Subject to any disclaimer, the term of this patent is extended or adjusted under 35 U.S.C. 154(b) by 77 days.

(21) Appl. No.: 10/473,281

(22) PCT Filed: Mar. 28, 2002

(86) PCT No.: PCT/AU02/00380

§ 371 (c)(1),
(2), (4) Date: Feb. 4, 2004

(87) PCT Pub. No.: WO02/079726

PCT Pub. Date: Oct. 10, 2002

(65) Prior Publication Data

US 2004/0125356 A1 Jul. 1, 2004

(30) Foreign Application Priority Data

Mar. 29, 2001 (AU) .................... PA4025

(51) Int. Cl.
*G01B 11/26* (2006.01)
*G01C 1/00* (2006.01)
(52) U.S. Cl. ................. 356/139.1; 356/4.01; 356/5.01; 33/285; 33/290
(58) Field of Classification Search .............. 356/139.1
See application file for complete search history.

(56) References Cited

U.S. PATENT DOCUMENTS 3,269,254 A * 8/1966 Kern et al. ................. 356/150
4,988,192 A * 1/1991 Knittel ....................... 356/138
5,784,155 A * 7/1998 Ohtomo et al. .......... 356/141.1
5,790,248 A 8/1998 Ammann

FOREIGN PATENT DOCUMENTS

| DE | 196 51 250 | | 3/1997 |
| DE | 197 57 461 | | 6/1999 |
| DE | 19757461 A1 | * | 6/1999 |
| DE | 299 14 639 | | 5/2000 |
| WO | WO 00/14480 | | 3/2000 |
| WO | WO 0014480 | * | 4/2000 |

* cited by examiner

*Primary Examiner*—Thomas H. Tarcza
*Assistant Examiner*—Luke D. Ratcliffe
(74) *Attorney, Agent, or Firm*—R. Neil Sudol; Henry D. Coleman; William J. Sapone

(57) ABSTRACT

A laser levelling apparatus includes a platform, a base assembly, a body assembly, a head assembly and a laser assembly. The body assembly is rotatable about a body axis relative to the base assembly, the head assembly is rotatably supported by the body and rotatable about a head assembly axis transverse to the body axis and the laser assembly supported by the head assembly and rotatable about a laser assembly axis which is transverse the head assembly axis. The laser assembly has a laser diode and focusing elements and laser collimator the laser beam with the laser assembly. The head assembly is mounted between a first shaft end mounted at a first position of the body and a second shaft end mounted at the second position of the body opposed to the first position. A head assembly collimator is used to adjust the axis of rotation of the head assembly. A base assembly leveller is used to adjust the level of the base relative to the platform in at least two transverse directions. The base leveller, laser collimator and head assembly collimator together and head assembly collimator together provide for collimator of the beam along three orthogonal axes.

18 Claims, 16 Drawing Sheets

LASER LEVELING APPARATUS

FIELD OF THE INVENTION

The present invention relates to laser levelling apparatus of the type commonly used in surveying, building and construction industries.

BACKGROUND OF THE INVENTION

Laser levelling and setting apparatus as well as other optical based apparatus such as automatic levels and theodolites are typically used in the surveying, building and construction industries to measure angles and inclination, for marking out, or to align walls and ceilings, for example.

Laser levelling apparatus in particular are used to generate reference lines, for example, by sweeping a laser beam in a plane and either observing a reflection line on a surface, or alternatively using electronic detectors to detect the beam. Known devices typically project a vertical laser beam into a 45° rotating prism which then reflects a horizontal sweeping beam. With these devices the beam is generally only rotated in a single plane, which is normally horizontal. With some devices it is possible to change from a horizontal to a vertical plane however this usually requires disassembling the laser head from the body and reassemble in an alternative configuration.

Still other devices allow for tilting of the laser to thereby create an angled beam for applications such as defining slopes and the like. However the tilt angle of such devices is normally restricted because the positioning of the laser head on the body results in the periphery of the body blocking the laser at certain angles. Thus these apparatus suffer from the drawback of lack of range of movement of the laser beam and are therefore restricted to use in relatively simple marking out tasks.

Some other known apparatus do allow the laser beam to be projected down through the centre of the apparatus so that the apparatus can be used to give a plumb line and to accurately align the apparatus over a style marking a specific reference point on a work site. Subsequently, apparatus have been developed which have two or three axes of rotation of a laser head but do not allow the laser to be projected down the centre of the apparatus. These apparatus do however provide an increase in the degree of movement but with that increase in movement comes problems with accuracy of movement of the laser. In U.S. Pat. No. 4,988,192 to Knittel, a laser levelling apparatus of the above type is disclosed. In that apparatus a laser diode is housed in a laser head which is in turn supported on a body. The laser head contains a laser as well as a prism for reflecting the laser beam at 90 degrees. The body is rotatable about a vertical axis and the laser head is in turn rotatable about a horizontal axis. The laser head itself is also rotatable about a third axis which is transverse to the direction of the laser beam projected from the head. Rather than rotating a prism to sweep the laser beam, the laser head is rotated. In this case the laser head contains a optical quality prism and a laser source and therefore the weight contained in the laser head exerts a significant load on the drive means used to rotate the head to sweep the laser. In addition the uneven distribution of weight may result in stability problems with the apparatus.

A further problem with many of the known apparatus is that a single instrument cannot be used to perform all of the end functions required by the end user, and in those instruments that do allow more than one function, it is usually necessary to 'set up' the instrument between different functions.

OBJECT OF THE INVENTION

The object of this invention is to provide a laser levelling device that obviates or alleviates any one of the above problems, or at least to provide the public with a useful choice.

SUMMARY OF THE INVENTION

For the purpose of this specification the word "comprising" means "including but not limited to", and the word "comprise" has a corresponding meaning.

Reference in this specification to a document is not to be taken as an admission that the disclosure therein constitutes common general knowledge in Australia.

In a first aspect although not necessarily the broadest or only aspect, the invention could be said to reside in a laser levelling apparatus including a platform, a base assembly, a body assembly, a head assembly and a laser assembly, the body assembly rotatable about a body axis relative to the base assembly, the head assembly rotatably supported by the body and rotatable about a head assembly axis transverse to the body axis, the laser assembly supported by the head assembly and rotatable about a laser assembly axis which is transverse the head assembly axis, the laser assembly having a laser diode and focussing elements and laser collimating means to collimate the laser beam with the laser assembly, the head assembly mounted between a first shaft end mounted at a first position of the body and a second shaft end mounted at a second position of the body opposed to the first position, and a head assembly collimating means to adjust the axis of rotation of the head assembly, and base assembly levelling means to adjust the level of the base relative to the platform in at least two transverse directions, wherein the base levelling, laser collimating means and head assembly collimating means together provide for collimation of the beam along three orthogonal axes.

It will be appreciated that the laser beam can be collimated along three orthogonal axes without the need to rotate the laser assembly, head assembly or body assembly about their respective axes and therefore increased accuracy in collimation may result because any inaccuracies in rotation angles do not affect the collimation.

The platform may be adapted with suitable connections to be mounted on, for example, a tripod.

Preferably the apparatus also includes drive means for driving rotation of the laser assembly around the laser assembly axis. Most preferably the drive means drives the laser assembly directly. The drive means may be a stepper motor with a rotatable shaft which is directly connected with the laser assembly, or alternatively the drive means may be a chopper motor.

In one preferred form the laser beam is projected in a direction substantially perpendicular to the laser assembly axis, which in turn is substantially perpendicular to the head assembly axis, which in turn is substantially perpendicular to the body assembly axis. The head assembly may be rotated to a first configuration in which the laser assembly axis is parallel with the body assembly axis, and a second configuration in which the laser assembly axis is substantially perpendicular to the body assembly axis.

The base levelling means may be used to adjust the orientation of the base so that the body assembly axis is vertical. Thus, when the apparatus is in the first configuration the laser beam is projected in a horizontal plane, whilst in the second configuration the laser beam is projected in a vertical plane.

The head assembly may also be selectively rotated to positions between the first and second configurations, thereby permitting projections of the laser beam in a sloping plane relative to the horizontal. This can be used, for example, to indicate a slope for earth moving machinery to work to as may be required for drainage control of a land site.

In one particular form of the invention the body is supported on the base assembly on a planar surface. In this way the weight of the body assembly is distributed over the area of the plane. Preferably a machined lower surface of the body sits on a machined upper surface of the base so that the body can rotate relative thereto with substantially no relative tilting. Where the machined surface extends adjacent to a periphery of the body a very stable relative rotation is provided for which is important given that leveling of the bases determines the rotational axis of the body assembly.

The base assembly may be supported on the platform through a central pivotal connection. The base levelling means preferably cooperates between the platform and the base assembly to allow adjustment of the height of the base relative to the platform in two orthogonal directions. In this way the tilt of the base, body, head and laser assemblies relative to the platform can be adjusted.

In one form of the invention the base levelling means includes two or more height adjustable feet which extend between and engage the platform and the base assembly so that adjustment of the height of one or more of the feet results in tilting of the base relative to the platform. The base levelling means may also contain one or more levelling bubbles for use in conjunction with the height adjustable feet to provide a visual indication of whether the base is level. In an alternative form the base levelling means may be an electronic automatic or semi-automatic levelling means as is known in the art.

Preferably the base levelling means is positioned at or adjacent the periphery of the body, or alternatively the distance between the levelling means and the point at which the base pivots on the platform is maximum. This may allow for greater control of the adjustment than when the adjustment is made at or near the pivot point.

Preferably the laser assembly includes a body having an internal cavity into which the laser is fitted so as to project the laser beam outwardly from the body. The laser assembly collimation means may include an elastomeric bearing fitted between the cavity and an outer surface of the laser so as to hold the laser in place within the cavity. Preferably the bearing is located toward one end of the laser and movement of the other end of the laser can then be used to alter the orientation of the laser with respect to the laser assembly body.

The first end of the head assembly may also contain a head assembly locking means for accurately locking the head assembly in 0, 90, and 180 degree positions. The head assembly locking means may include a locking wedge for engaging the head assembly and containing four radially outwardly projecting tabs spaced at 90 degree intervals at one end, with the tabs engageable in corresponding slots in a bearing block, wherein the tabs can be disengaged from the slots to allow rotation of the head assembly and re-engaged in either of the 0, 90, or 180 degree positions.

The head assembly may include rotational collimating means for rotating the head assembly relative to the body. In this way the head assembly axis can be rotated relative to the body and the quadrant locking means.

The laser assembly may contain laser assembly locking means for accurately locking the laser assembly in 0, 90, 180 and 270 degree positions. The locking means may be released and the laser assembly rotated to either of the 0, 90, 180 and 270 degree positions wherein the locking means can only be re-engaged when the laser assembly is in either of those positions. In one form the laser assembly locking means is in the form of a locking pin which is reversibly engageable within a slot in the head assembly and which has a tab extending therefrom which is adapted to fit into one of four slots located at 90 degree intervals around the laser assembly.

In one preferred form the platform, body, and base contain mutually aligned central bores to allow projection of the laser beam down the centre of the apparatus. In this form preferably the head assembly axis is offset from the diameter of the body by an amount that is equivalent to the distance between the head assembly axis and the laser. In this way the head assembly can be rotated so that the laser is projected down the centre of the apparatus.

BRIEF DESCRIPTION OF THE DRAWINGS

For a better understanding the invention will now be described with reference to an illustrated embodiment. The drawings describe an illustrated embodiment wherein.

DETAILED DESCRIPTION OF THE ILLUSTRATED EMBODIMENT

Figure 1:
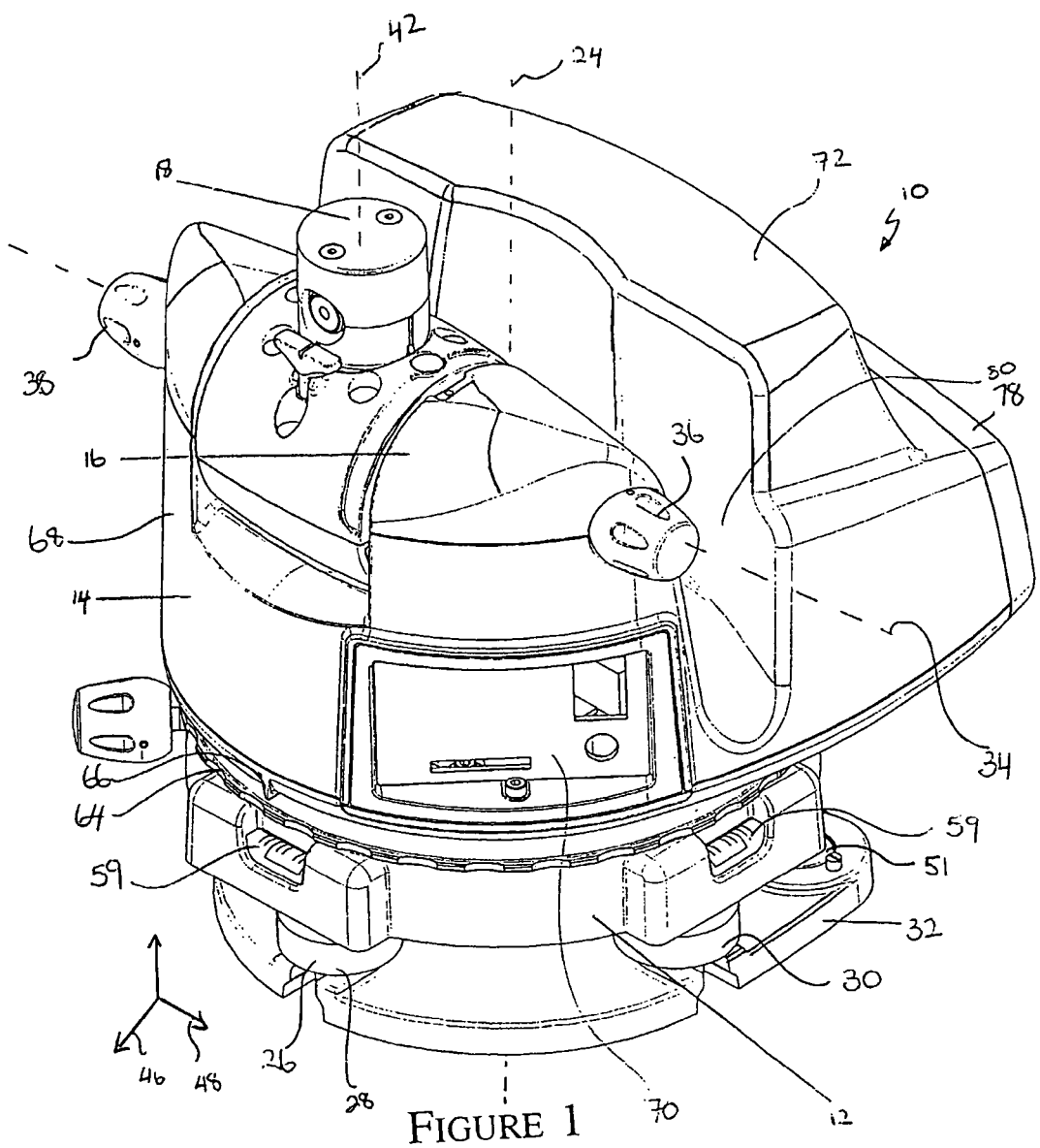
FIG. 1 is an isometric view of a laser levelling apparatus with head and laser assemblies in a first configuration.

Similar reference characters indicate corresponding parts throughout the several views of the drawings.

Dimensions of certain of the parts shown in the drawings may have been modified and/or exaggerated for the purposes of clarity or illustration.

Shown is a laser levelling apparatus (10) having a base assembly (12), a body assembly (14), a head assembly (16) and a laser assembly (18). The body assembly is rotatably supported by the base assembly with a lower planar machined surface (20) of the body engaging a corresponding upper planar surface (22) of the base. The body assembly is rotatable on the base around a body assembly axis (24), which in general is shown as a vertical or near vertical axis. Body assembly levelling means (26) is used to adjust the tilt of the body and base relative to a supporting platform in two transverse directions. In the illustrated embodiments the levelling means includes two height adjustable feet (28) and (30) that are angled 90 degrees from each other in plan view. The feet cooperate between a platform (32) on which the apparatus sits, and the base. The adjustable feet are used in conjunction with linear level bubbles (59) to adjust the orientation of the base and body assembly relative to the platform and the supporting surface such as the ground.

Figure 15:
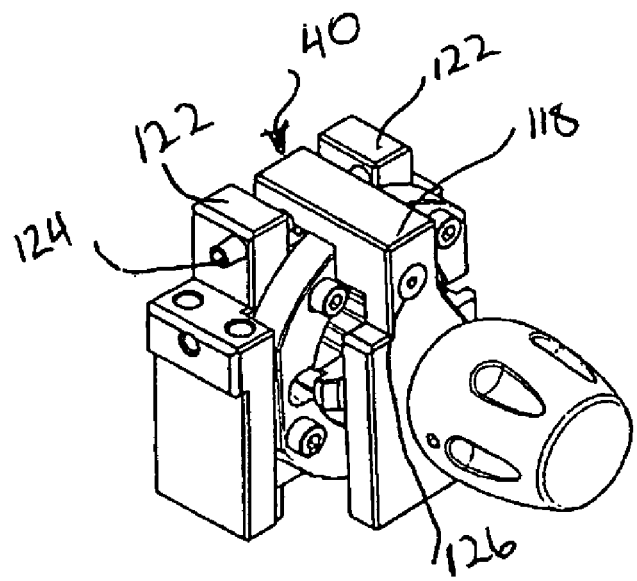
FIG. 15 is an isometric view of an assembled head assembly collimating means.

The head assembly (16) is rotatable on the body assembly about a head assembly axis (34) which is transverse to the body assembly axis (24). The head assembly axis will therefore typically be horizontal. The head assembly is mounted on a shaft between a first shaft end (36) which is fixed at a first position of the body and a second shaft end (38) which is fixed at a second position of the body. The first and second positions are non-diametrically opposed to one another, which means that the head assembly axis is not diametrical. The first shaft end contains a head assembly collimating means (40) for aligning the head assembly axis (see FIG. 15). This will be discussed in more detail later.

The laser assembly (18) contains a laser supported within the assembly. The laser assembly is rotatable around a laser assembly axis (42) which is transverse to the head assembly axis. In the configuration illustrated in FIG. 1, the laser assembly axis is parallel to the body assembly axis but is not coaxial with that axis. The laser assembly includes a collimating means (44) for aligning the laser with the laser assembly (see FIG. 17).

The apparatus therefore contains three axes of rotation (24), (34) and (42). This means that the apparatus is not restricted to projecting the laser beam only in vertical or horizontal planes and sloping planes and other angles can be marked out or measured using the apparatus. The apparatus also contains three tilt collimating means (26), (40) and (44). In this way the laser can be collimated along three separate axes (see arrows in FIG. 1) without the need for rotation around any of the three axes of rotation. As a result, collimation of the laser may be more accurately performed as all collimation adjustments are made without moving the laser assembly. It will be appreciated that without the three collimation means, the laser could be collimated along one axis, for example arrow (46), and also along a second axis, for example arrow (48). However for collimation along the third axis the laser assembly has to be rotated by 90 degrees. If the angle of rotation is not exactly 90 degrees then collimation with the last axis will also affect the other axes as well.

The laser assembly is rotatable through 360 degrees, the head assembly is rotatable through 180 degrees and the body assembly is also rotatable through 360 degrees. Laser radiation is projected substantially perpendicular to the laser assembly axis, the laser assembly axis is substantially perpendicular to the head assembly axis, and the head assembly axis is substantially perpendicular to the body assembly axis. The head assembly can be rotated between a first position (FIG. 1) in which the laser assembly axis is parallel to the body axis, and a second position (FIG. 2) in which the laser assembly axis is perpendicular to the body axis.

In the first position the laser assembly axis is vertical and the laser beam is projected horizontally. In the second position the laser assembly axis is horizontal and the laser beam can be projected vertically downwards or rotated about a plane with intersects with the centre of the body assembly. The head assembly can also be rotated by 180 degrees from the second position and into a third position in which the laser assembly axis is still horizontal and the laser beam is vertical but upwardly projected or rotatable about a plane outside of the periphery of the body assembly.

Rotation of the laser assembly by 180 degrees in either of the second or third configurations also allows the beam to plumb to a reference point in the second position as well as in the third position to provide for a full 360 degree vertical rotation. These feature is useful in zenith and plumb work. In particular the laser beam can be projected through the centre of the apparatus and stand to give a plumb line. The plumb line can also be used to accurately align the apparatus over a style marking a specific reference point on a work site.

When the beam is projected down the centre of the apparatus, the beam is coaxial with the body assembly axis and therefore rotation of the body assembly does not change the relative position of the laser beam with respect to the body axis. This allows for ease of marking out a construction site.

Drive means in the form of an electric stepper motor is used to drive rotation of the laser assembly. The drive means is a direct drive in that a shaft passes directly between the motor and the laser assembly and the shaft is driven directly by the motor and not through a belt or cog drive mechanism.

The base is mounted on a platform (32) which can be supported on a tripod having three legs (not shown) as is well known in the art. As an alternative, the platform could also be supported on any other suitable supporting surface, such as a table or the like.

The platform contains a platform level indicator in the form of a circular levelling bubble (51). Thus in setting the apparatus up, the platform can be set horizontally for example by altering the length of one or more of the tripod legs in a manner that is well known. The platform level indicator is used to ensure the platform is set up in a horizontal plane and also stays in that orientation when the apparatus is in use.

Figure 6:
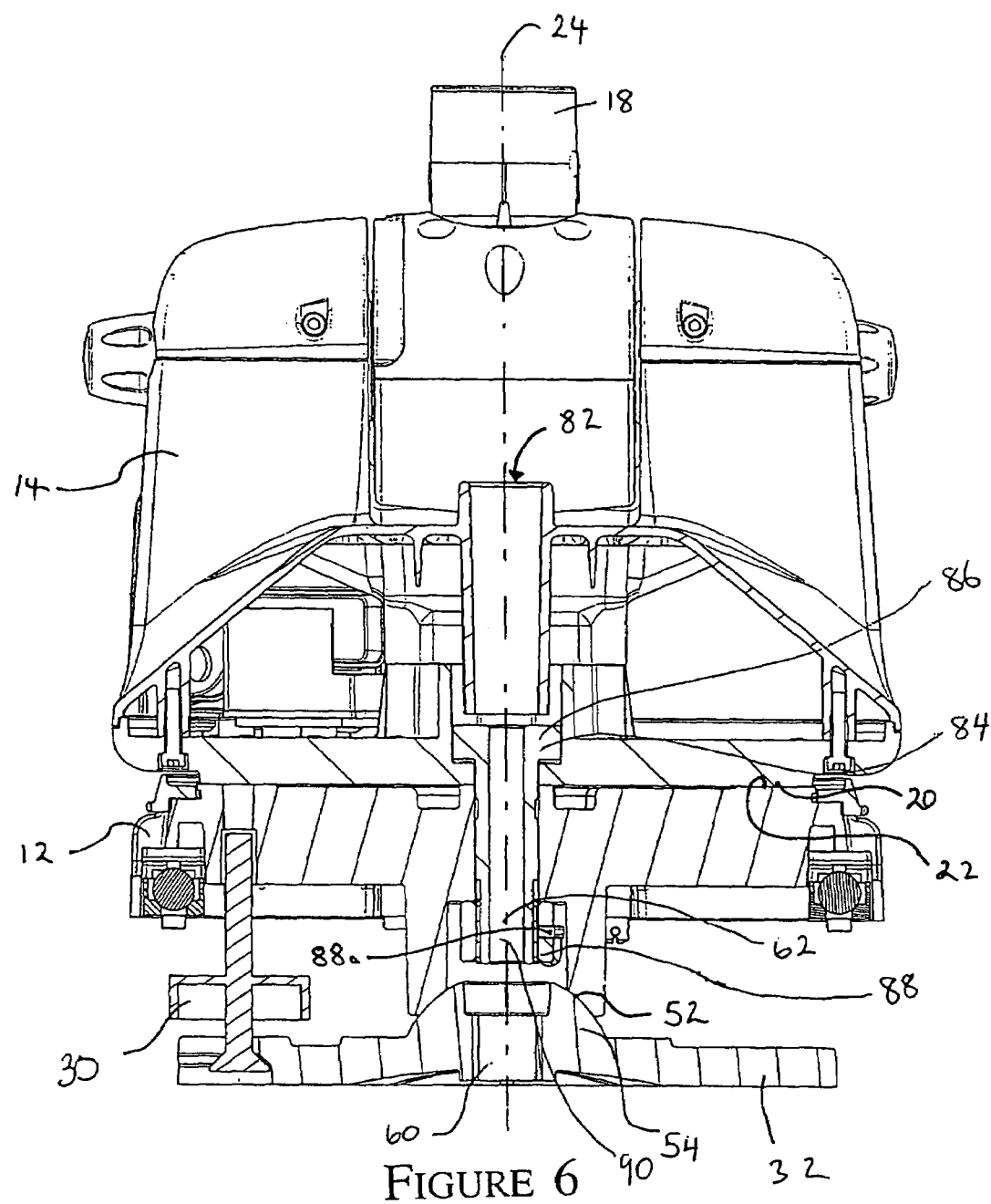
FIG. 6 is a cross sectional view through 6–6' in FIG. 5.

The base assembly is supported centrally on the platform through a ball and socket type fitting wherein a socket (52) extends centrally from the underside of the base and a dome shaped protrusion (54) is located centrally on the platform (best seen in FIG. 6). The dome shaped socket sits on top of the protrusion so that the body is supported on the platform and universal movement of the base assembly relative to the platform is possible. Two height adjustable feet (28) and (30) extend between and engage both the platform and the base assembly. The feet effectively lock the orientation of the base relative to the platform. An outer surface of each foot is threaded at a base end which is screwed into a correspondingly threaded cavity on the underside of the base. A platform end of each foot contains an outwardly flared section which engages a correspondingly flared aperture in the platform so that the outward taper of the foot engages the taper on the underside of the aperture to prevent upward movement of the foot once the two tapered surfaces are engaged. Each foot also contains a radially extending control knob to assist the user in turning the foot.

There are two threaded height adjustable feet and each foot is located toward a periphery of both the platform and the base. The feet are at positions 90 degrees to one another when seen in plan view as perhaps best appreciated from FIG. 1. The feet also prevent rotation of the base in a horizontal plane relative to the platform. Each of the feet is associated with a spirit level bubble (59) to assist in levelling the base. Adjustment of the height of the feet allows the base to be tilted along two orthogonal axes and therefore provides for a full range of tilt of the plane of the base relative to the platform. The spirit level bubble may also contain a graduated scale to allow the base to be specifically set at angles to allow for slope work. For example 4% inclination full scale graduated spirit bubbles are known in the art and may be used with the present invention.

The spacing of the feet toward the periphery of the base allows for good control of movement of the base because of the separation of the adjustment points from the point about which the base pivots on the platform. This has the same effect as increasing the length of a lever. This is to be compared with known apparatus whereby pins act in two orthogonal directions on a central shaft at the bottom of the base in order to tilt the base. In the latter case the controlling points are very close to the pivot point at the centre of the base which is top heavy. As a result, the weight of the body as well as the lack of leverage due to the closeness of the adjustment points to the centre make adjustments more difficult to control. In contrast the enhanced lever action caused by the spacing of the threaded pins in the present apparatus enables greater control and finer adjustments can be made.

In an alternative form that is not illustrated the base levelling means includes semi-automated or automated means to effect levelling of the base, as is known in the art.

The platform has a central hollow tube (60) which is coincident with a central hollow tube (62) in the base see FIG. 6. The tube allows the laser beam to be projected directly down the centre of the apparatus to thereby allow it to be used for plumb work.

Figure 2:
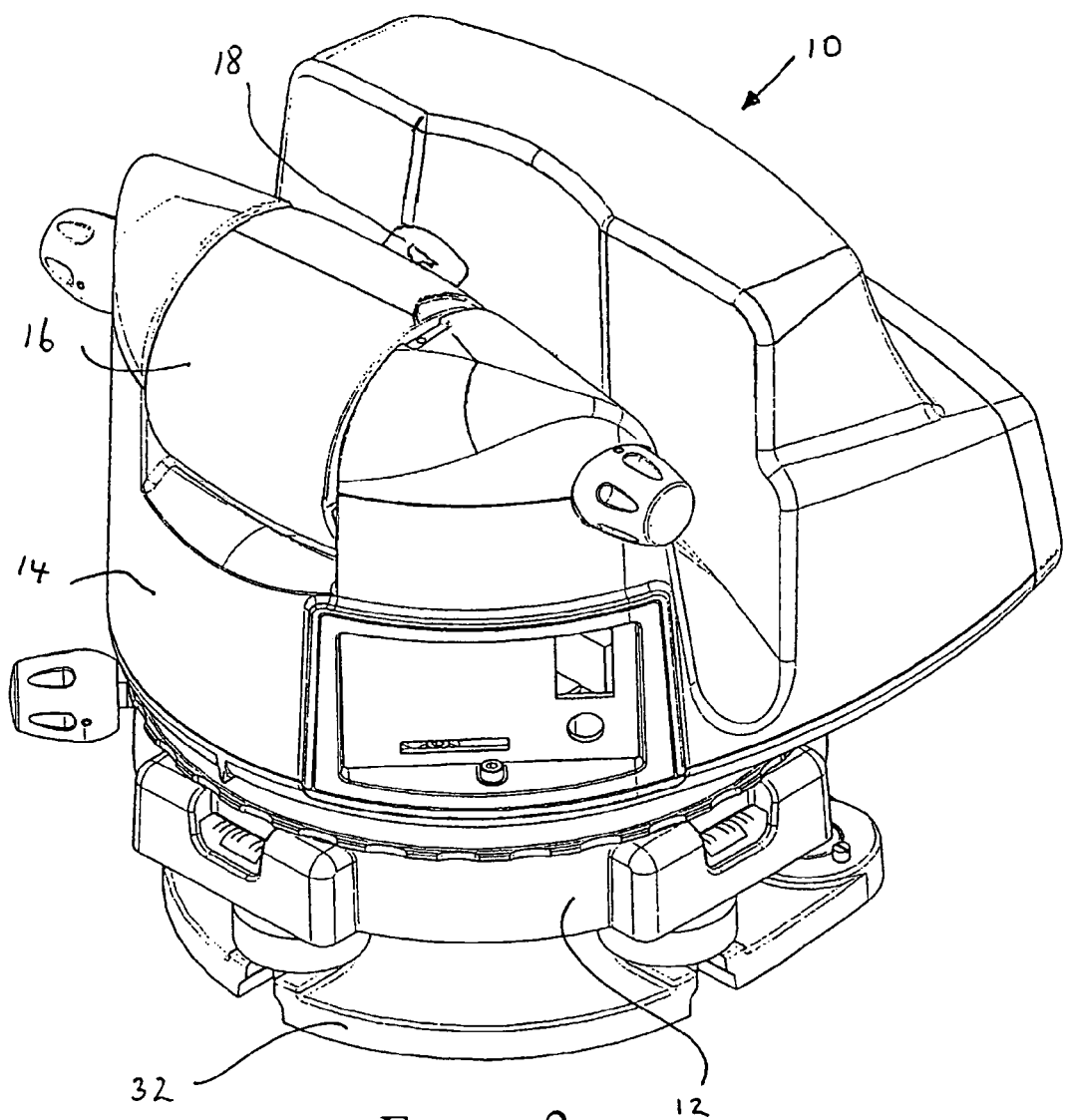
FIG. 2 is an isometric view of the laser levelling apparatus with head and laser assemblies in a second configuration.
Figure 3:
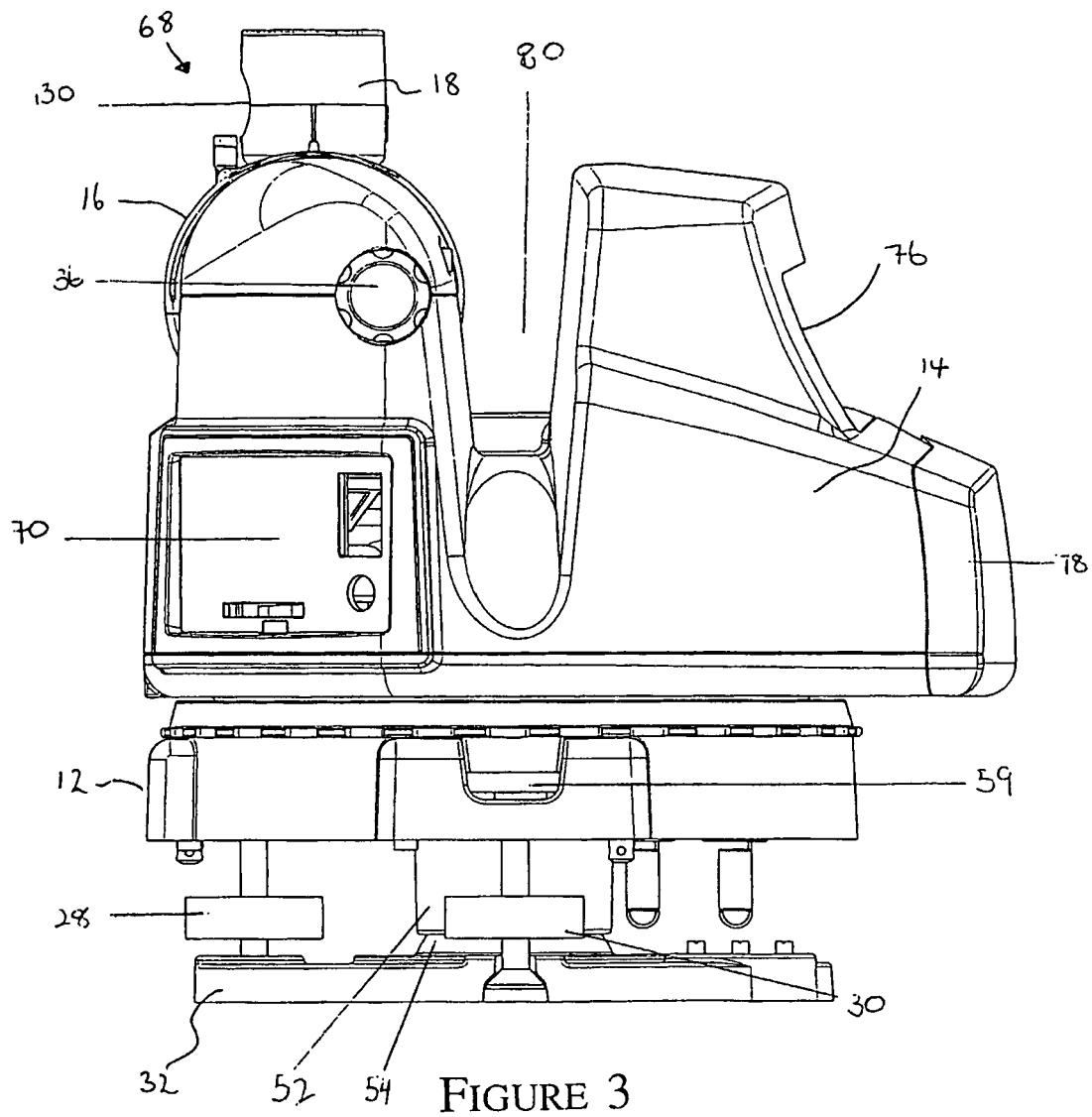
FIG. 3 is a side view of the laser levelling apparatus with head and laser assemblies in the first configuration.
Figure 4:
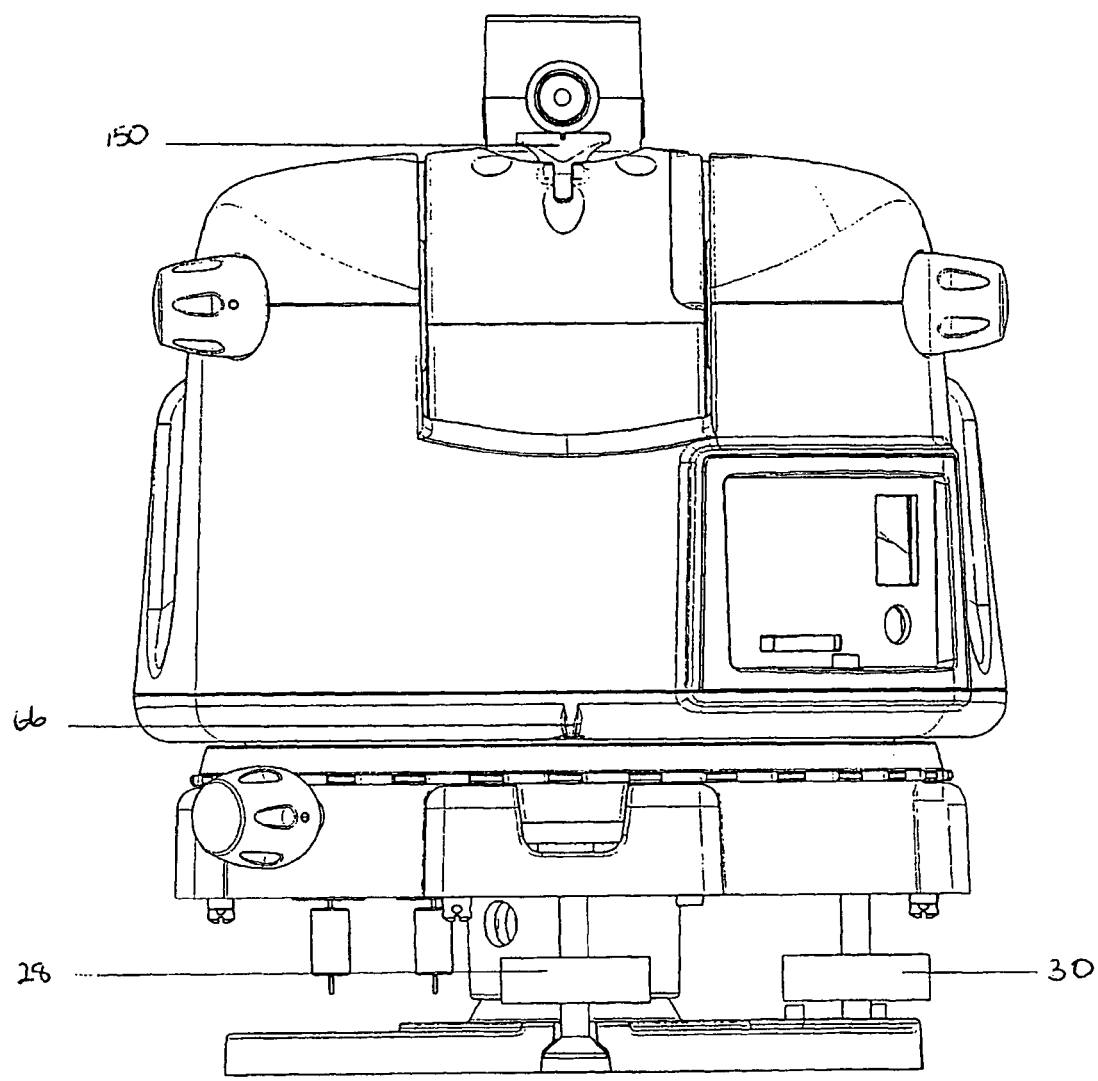
FIG. 4 is a front view of the laser levelling apparatus with head and laser assemblies in the first configuration.
Figure 5:
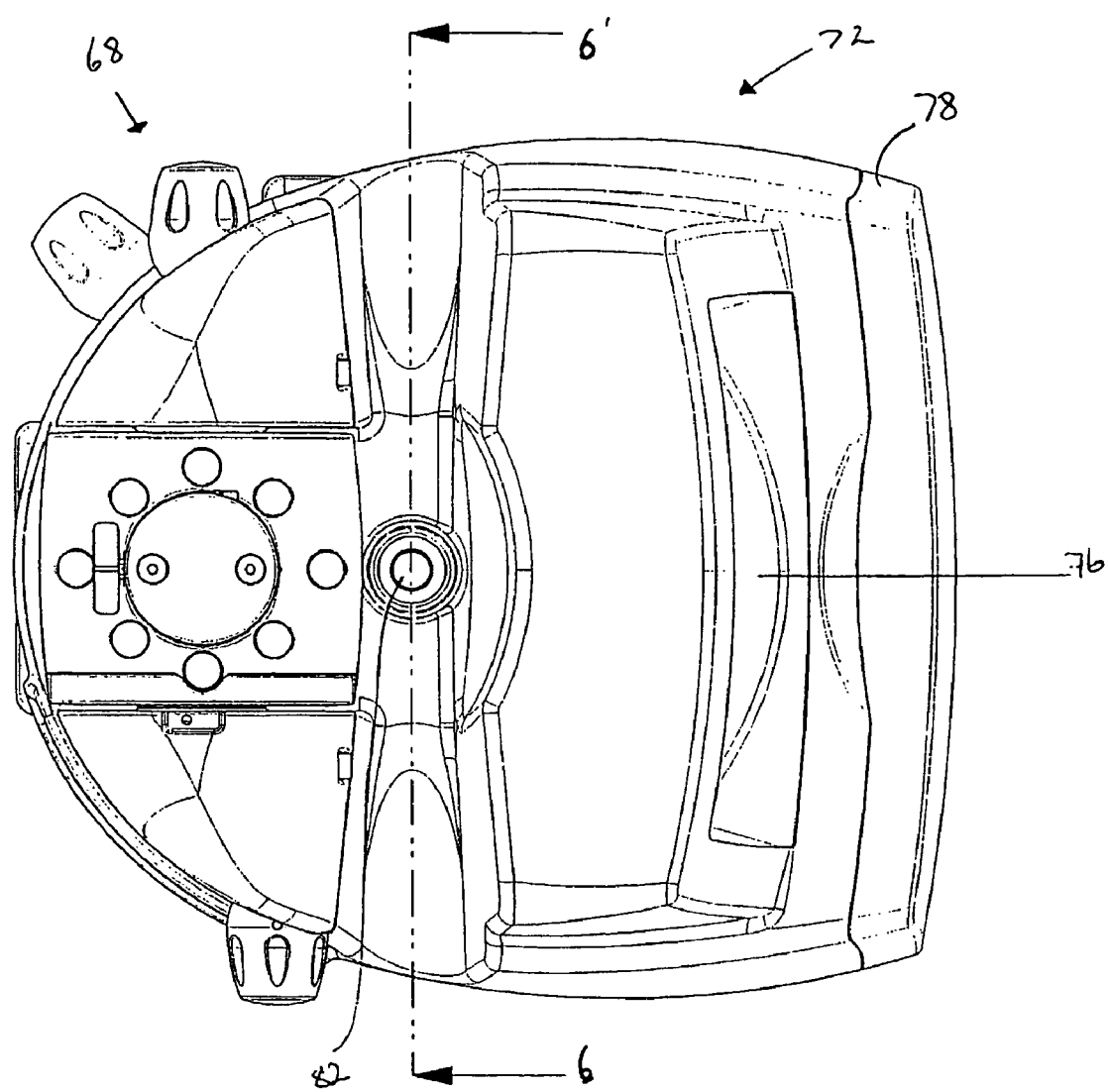
FIG. 5 is a top view of the laser levelling apparatus with head and laser assemblies in the first configuration.

The periphery of the upper surface of the base contains an annular ring (64) which contains indicia indicating angles from 0 to 360 degrees (see FIG. 1). A lower edge of the body contains a marker (66) which in combination with ring (64) can be used to measure the angle of rotation of the body relative to the base.

As mentioned, the upper surface of the base is a planar machined surface. A corresponding lower surface of the body contains a similarly planar machined surface so that the two faces engage one another and can be rotated in their respective planes over one another. Optionally, one or both of the machined surfaces may be coated with a suitable anti-friction material to reduce friction and permit easier rotation of the two surfaces over one another. This plane on plane arrangement provides a stable engagement of the body onto the base because the weight of the body is distributed over the whole area of the machined surfaces. In contrast, other levelling devices are known to have the body connected to a central spindle which in turn is journalled into the base. In this latter form there is not normally any contact between the upper surface of the base and the lower surface of the body. Hence in this latter case the load is borne only over the cross sectional area of the spindle. As can best be seen in FIG. 6 the surfaces are also positioned at or adjacent the periphery of the base and body assemblies. This allows for minimal relative tilting between the two.

An upper part of the body assembly (14) is diametrically divided into two hemispherical upper sections. A first (68) of the sections contains the head and laser assemblies on an upper surface as well as control circuitry and a control panel (70). The control panel is in electrical connection with a battery as well as the motor driving the laser assembly as discussed later. A second section (72) carries a power source such as a battery (74) and a recessed handle (76) for carrying the apparatus. The battery is covered with a battery cover (78) which snaps into place and allows easy access to the battery.

The two hemispherical sections are divided by a recess (80) which extends across the diameter of the base. The width of the recess is sufficient to accommodate the laser assembly so that the laser can be shone down through the centre of the apparatus. A central bore (82) extends through the body and is aligned with the hollow tubes in the base and the platform to allow passage of light down the centre of the apparatus.

Rotation of the body on the base in conjunction with projection of the beam down the centre of the apparatus can be used for accurate set out or measurement of angles from fixed pegs or surveyed points.

The body assembly (14) is connected to the base assembly (12) through a central bolt (84) (see FIG. 6). The head (86) of the bolt abuts an annular flange in the bore (82), and the bolt passes through the body and base and into a cavity in the socket (52). A nut (88) is threaded onto the bolt to thereby hold the base and body together. The bolt has a central bore (90) which is aligned with the bore of the body and the tubes of the base and platform so that the laser beam can be projected therethrough.

A locking pin (88a) extends radially into an outer surface of the bore (82) so as to lock the body assembly relative to the base assembly and therefore prevent unwanted rotation.

Figure 8:
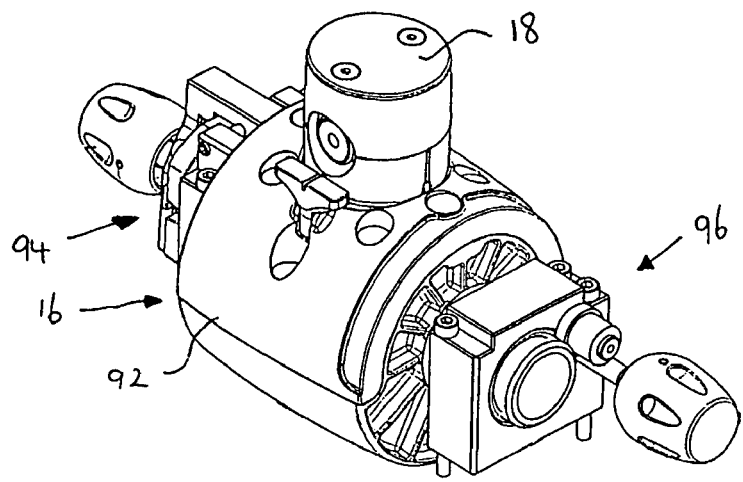
Figure 9:
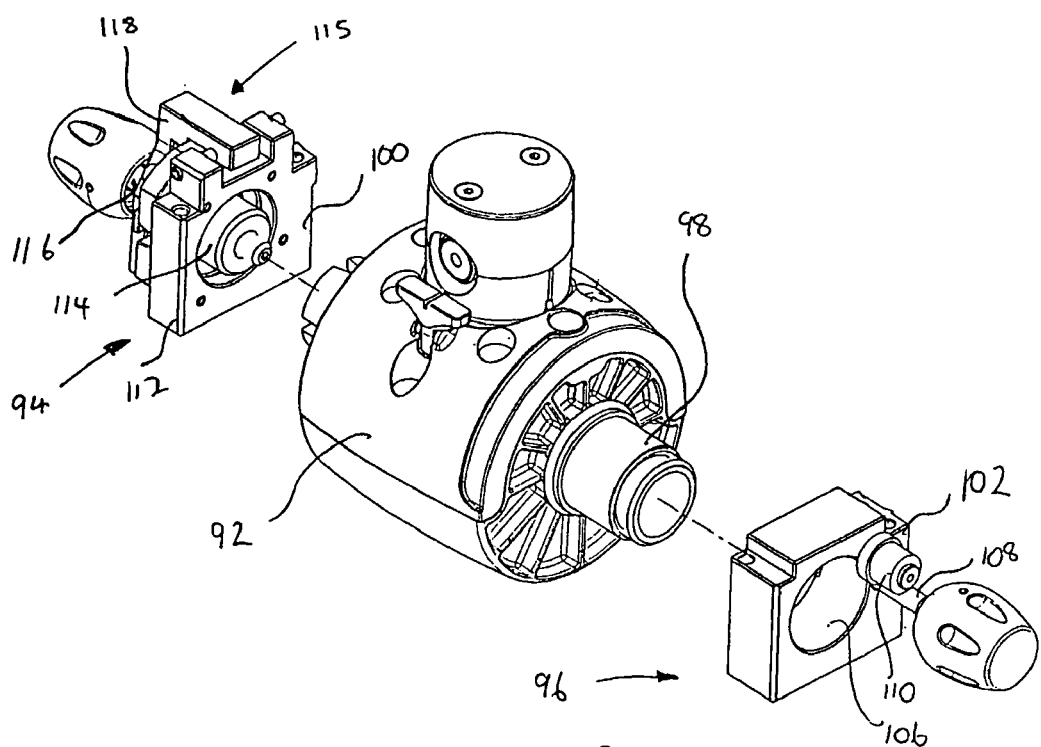
FIG. 9 is an exploded isometric view of a head assembly.
Figure 10:
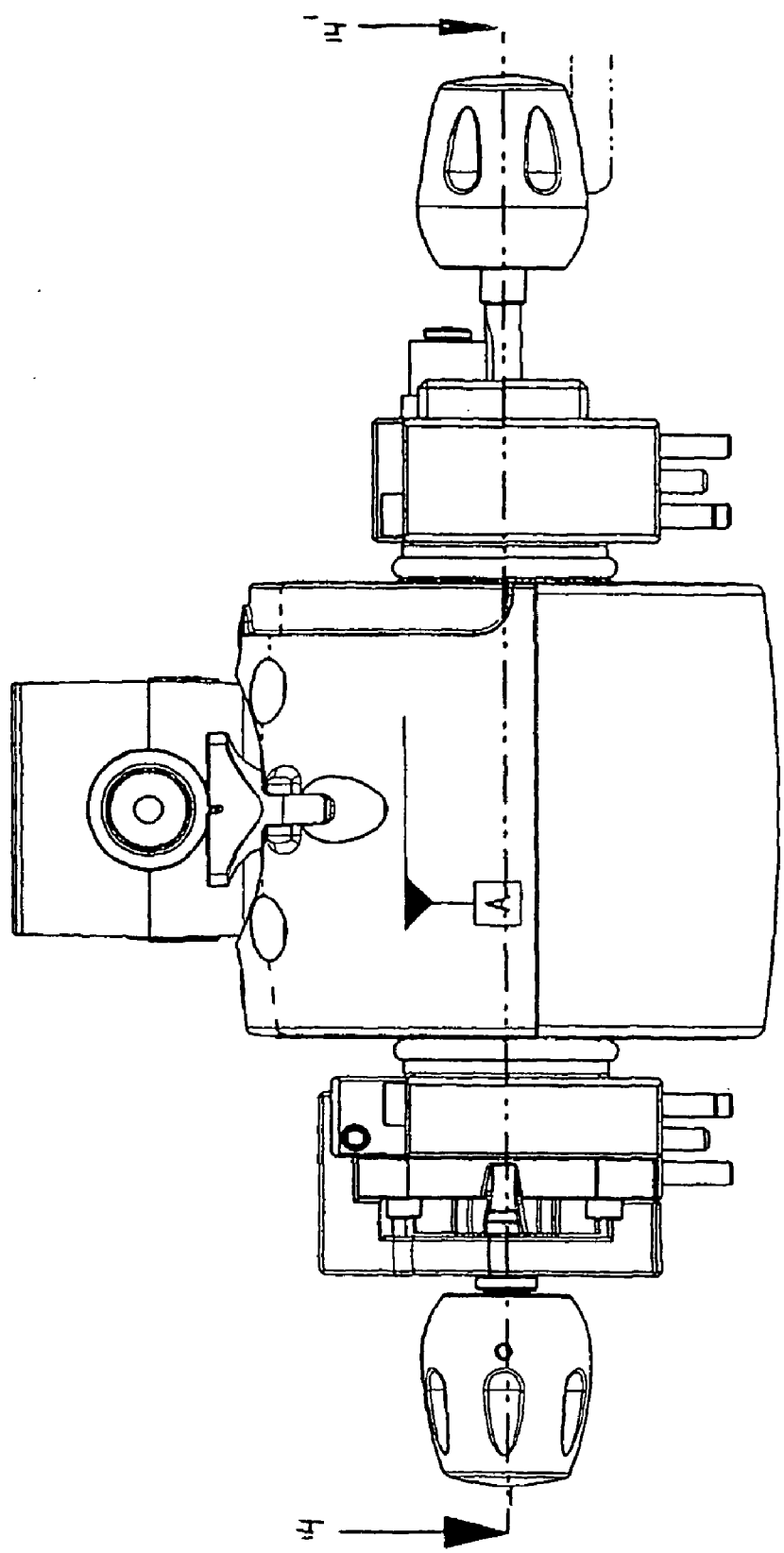
FIG. 10 is a front view of a head assembly.
Figure 11:
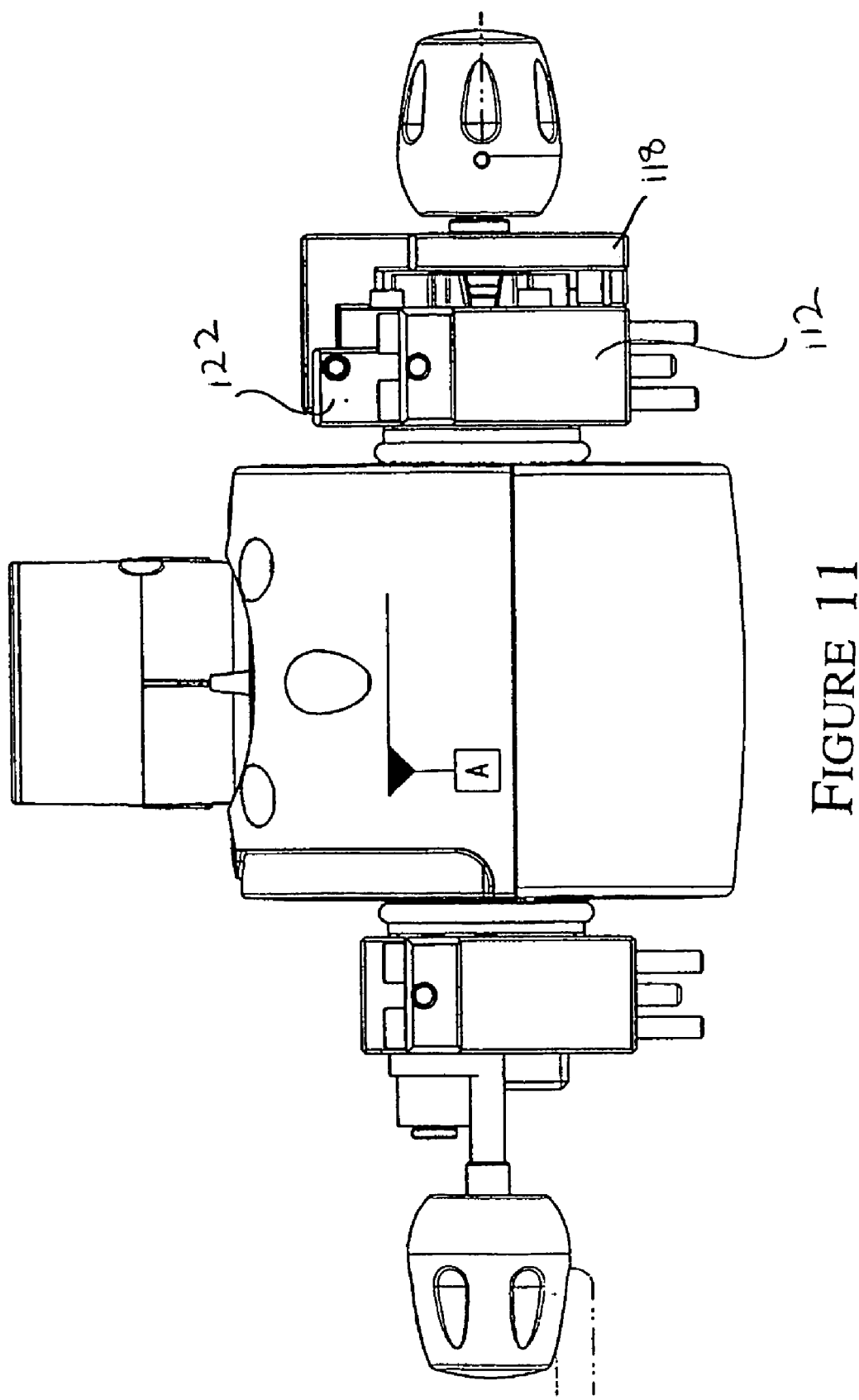
FIG. 11 is a rear view of a head assembly.
Figure 12:
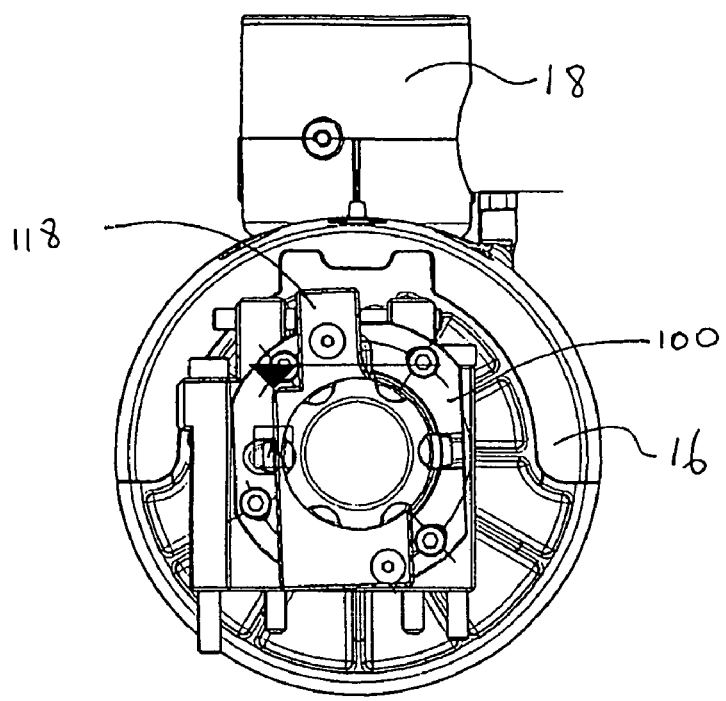
FIG. 12 is a view of a head assembly from the first end.
Figure 13:
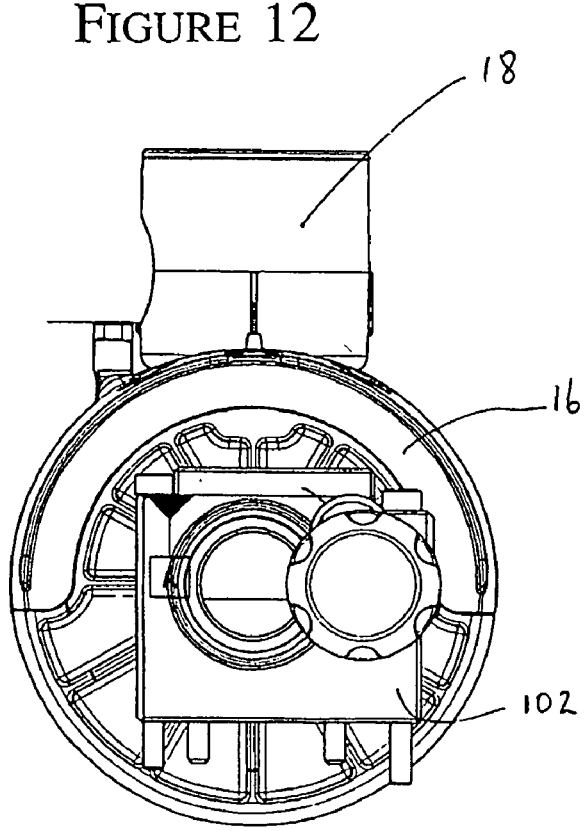
FIG. 13 is a view of a head assembly from the second end.
Figure 14:
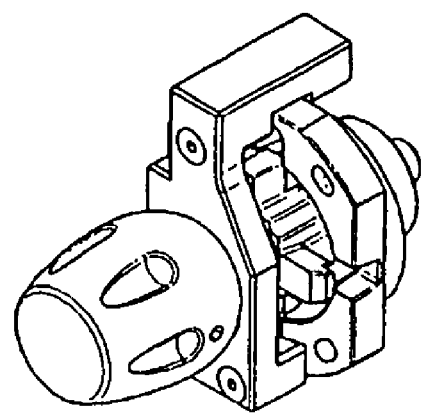
FIG. 14 is an isometric view of an assembled quadrant locking means.

The head assembly includes a barrel like middle section (92) supported for rotation between end sections (94) and (96) (see FIGS. 8 and 9) which are connected to a pedestal (not shown) which is in turn fixed to the body assembly (14). Each end section is covered by a body cap to prevent ingress of dust and other foreign matter. The barrel section has a central hollow axle (98) which is journalled at one end within a first end bearing (100) and at a second end by a second end bearing (102). The first and second end bearings are fixed to the pedestal with screws.

The second end bearing contains a central aperture (106) into which the axle (98) is fitted. A gear drive roller lever (108) is journalled to the bearing and an intermediate gear roller (110) bears against a second end of the axle (98) and lever (108) and this provides a geared mechanism for rotating the barrel and hence the head assembly through any required angle. It will be appreciated that the drive mechanism need not be geared and could be a direct drive with a rotation knob fitted to the second end of axle (98). The barrel assembly also contains indicia to indicate that angle at which the barrel is rotated relative to the body.

The first end of the head assembly contains a head assembly locking means that allows stepped rotation of the head assembly to 0, 90, 180 using mechanical means, although a digitally encoded rotary system with an LCD digital display may also be used to set angles of the head assembly. It is also envisaged that similar digitally encoded rotary systems could be used to measure angle of rotation of the body assembly and the laser assembly.

Figure 7A:
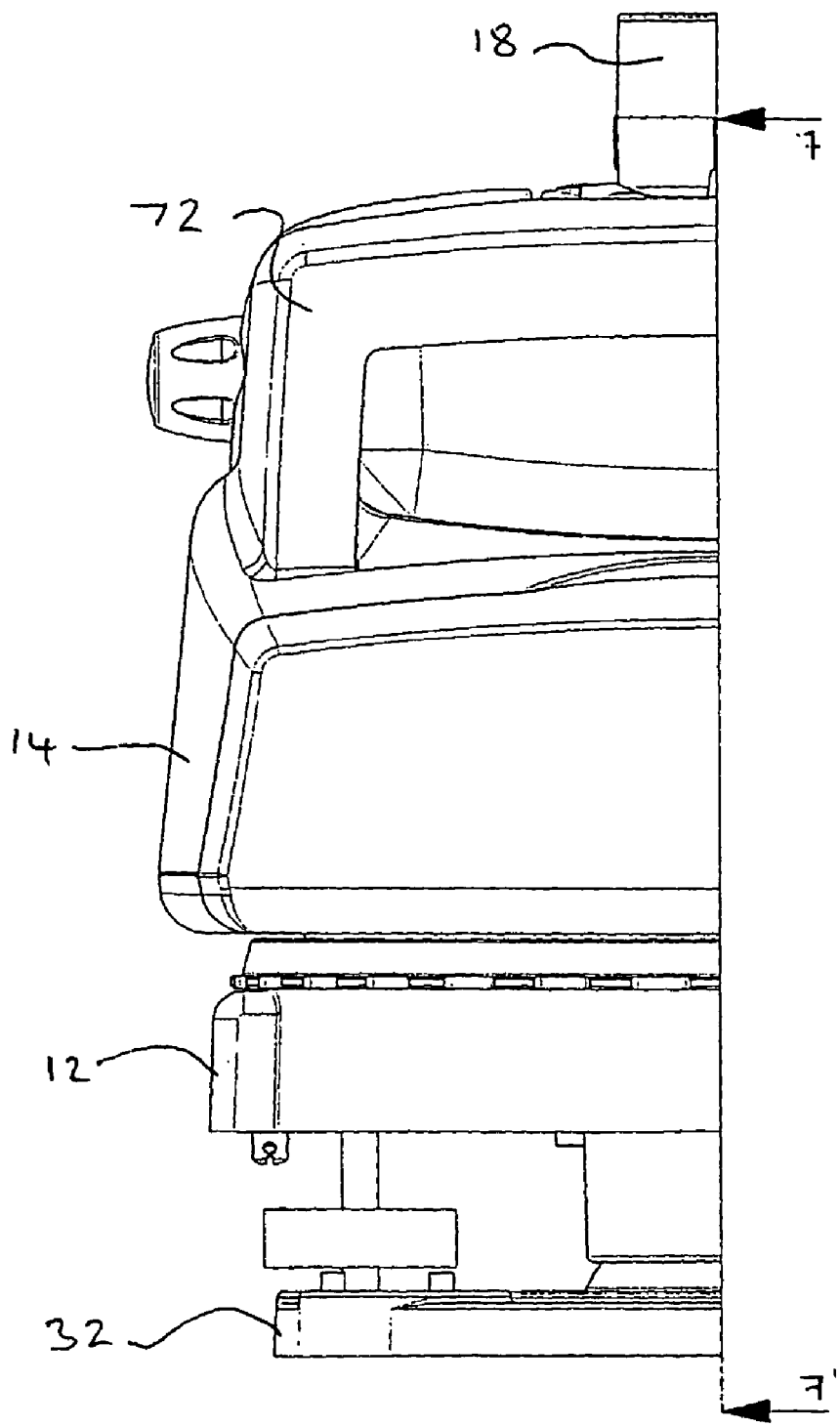
FIG. 7a is a half back view of the laser levelling apparatus in the first configuration.
Figure 7B:
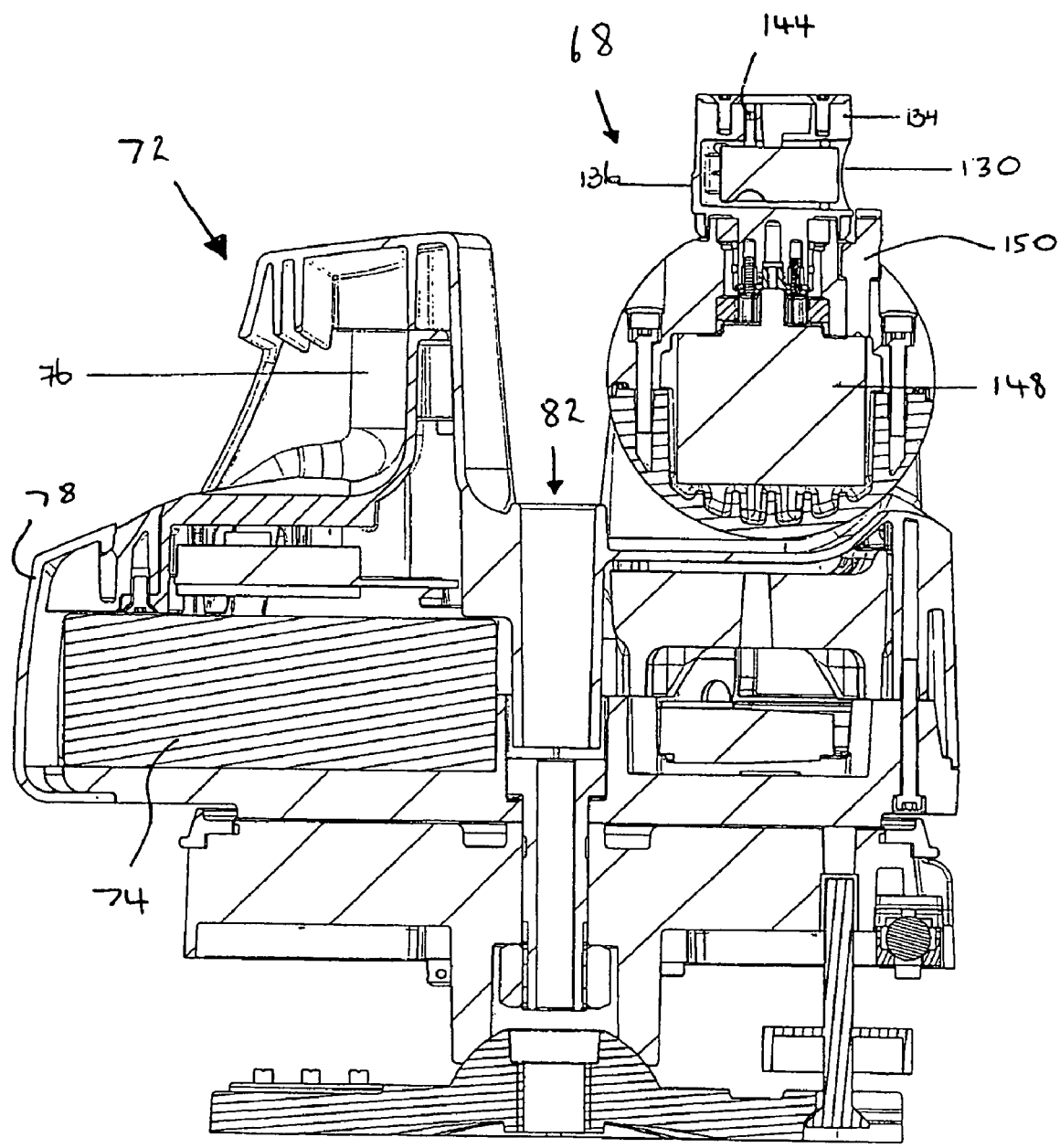
FIG. 7b is a cross sectional view through 7–7' of FIG. 7a, FIG. 8 is an isometric view of a head assembly.
Figure 18:
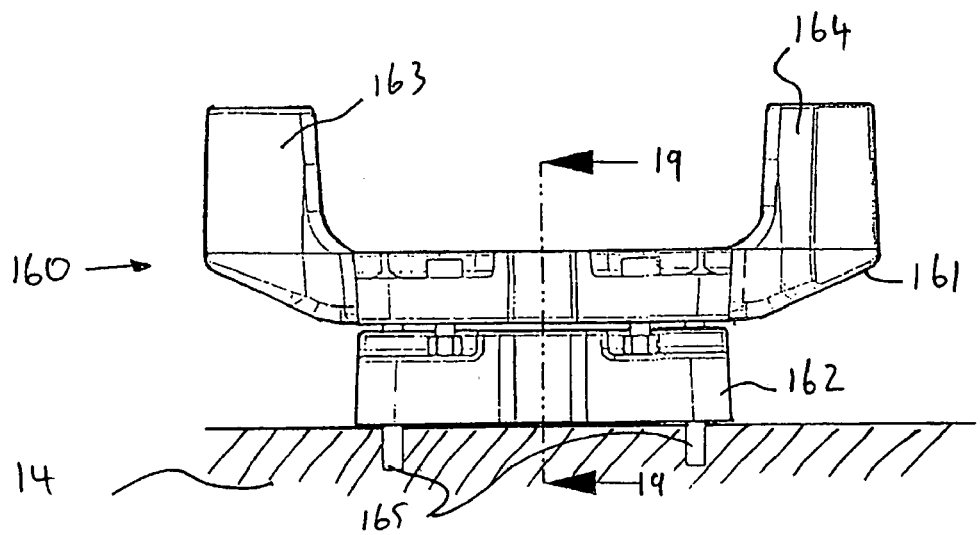
FIG. 18 is a front view of the adjustable pedestal by which the head assembly is mounted to the body assembly.
Figure 19:
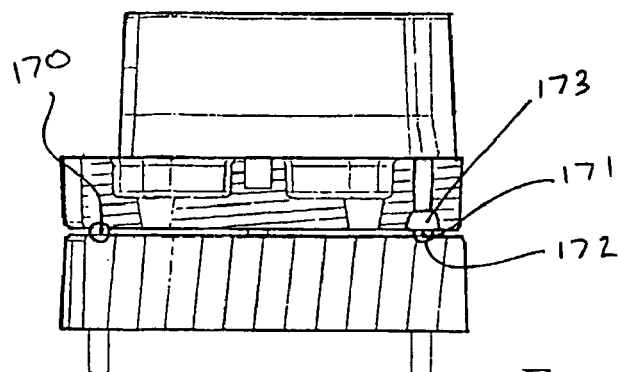
FIG. 19 is a cross section through 19—19 of FIG. 18 showing part detail of the collimating mechanism.
Figure 20:
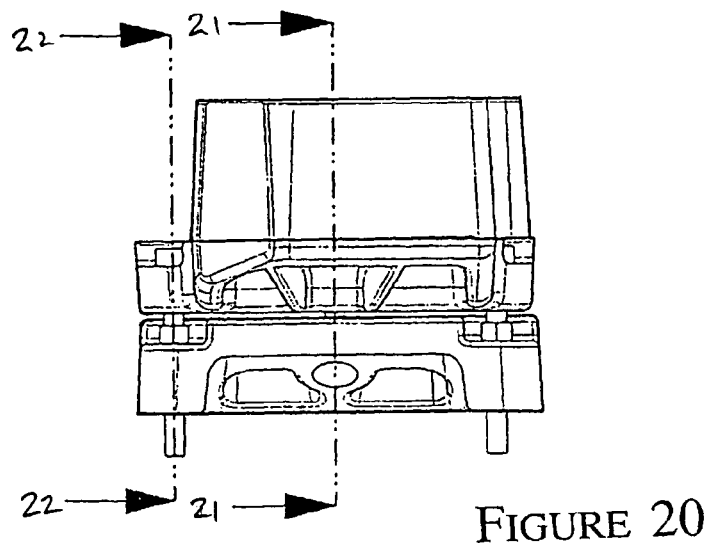
FIG. 20 is a side view of the adjustable pedestal of FIG. 18.
Figure 21:
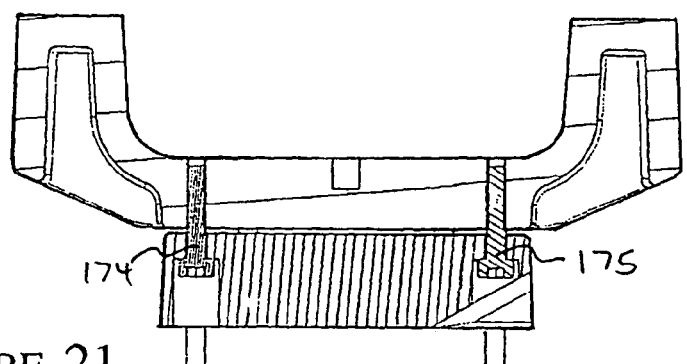
FIG. 21 is a cross sectional view through 21—21 of FIG. 20.
Figure 22:
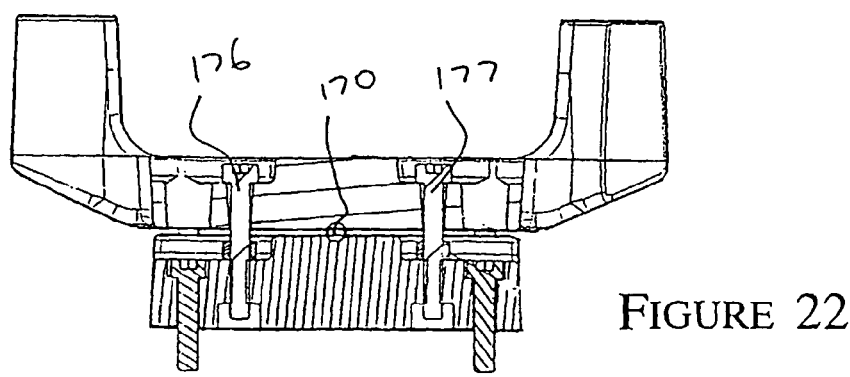
FIG. 22 is a cross sectional view through 22—22 of FIG. 20.

The orientation of the head assembly axis (34) can be altered using the head assembly collimating means (40) (see FIGS. 7b and 18), which includes means for rotating the barrel section of the head assembly relative to the body, has two posts (122) extending upwardly from the top surface of block (112). Part of the L-shaped bracket (118) is fitted between the posts (122) and screws (124) threaded through each post each engage a side of the part of the bracket. By threading the screws the position of the L shaped bracket between the posts can be altered. As a result the rotational position of the locking wedge and the barrel relative to the block bearing (112) is changed. In order to change the position of the locking bracket, screws (126) holding the L-shaped bracket onto the block (112) are unscrewed and the screws in the posts are adjusted as desired. As the rotational position of the barrel relative to the head assembly locking means changes, then the angle of the laser beam can be adjusted in a vertical plane so that it is projected horizontally when the head assembly locking means is set at the 0 degree position. It will be appreciated that this collimation will usually be performed at the time of manufacture or at regular service intervals.

The laser assembly is rotatably supported centrally on the barrel section (92) of the head assembly. In this way rotation of the barrel assembly about the head assembly axis allows the laser assembly to be moved through an angle of about 180 degrees. The laser assembly sits proud of the barrel surface and therefore when the barrel is rotated by 90 degrees from the configuration shown in FIG. 1, the beam passes downwardly outside the periphery of the body and base assemblies and the platform. This means that the angle of the beam can be adjusted between horizontal and vertical without interference from the body or base assembly.

Figure 17:
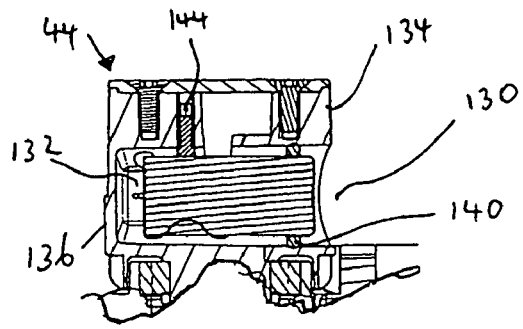
FIG. 17 is a cross sectional view through the laser assembly.

The laser assembly includes a generally cylindrical body (128) which houses and protects the laser (see FIG. 17). An aperture (130) in a side of the laser assembly body allows transmission of the laser beam from the assembly. The aperture may be covered with a light transmissive cover or alternatively with a lens as necessary. The laser is housed within an elongate cavity (132) inside the laser assembly body. The body is formed in two halves, with the upper half (134) fixed to the lower half (136) using screws or other fasteners. The top half can be removed to access the laser for changeover, repairs and the like. The lower half of the body is rotatably journalled within a circular cutout in the top surface of the barrel. A shaft extends downwardly and centrally from the lower surface of the body and the shaft is connected to a corresponding spindle of a stepper motor which is housed in the interior of the barrel. The laser is cylindrical in shape and is held within the cavity by way of an elastomeric bearing (140) fitted between internal walls of the cavity and the outer surface of the laser. The elastomeric bearing is fitted toward an emission end of the laser and therefore the angle of the laser can be changed relative to the cavity and hence the laser assembly be moving the rear of the laser, with the emission end held in place by the elastomeric bearing. In this way the laser beam can be collimated with the laser assembly. To assist with the adjustment, adjusting screws are fitted through the body of the laser assembly and contact each side of the laser. The screws can be rotated to thereby move the rear end of the laser in a generally horizontal plane when the head and laser assemblies are in the first configuration shown in FIG. 1 and then to lock the laser in that position. In this manner the laser can be collimated so as to rotate within a plane perpendicular to the laser assembly axis. A third screw (144) co-acting with a threaded vertical hole in the top half of the laser assembly body allows the rear end of the laser to be tilted up and down in a vertical plane as well. It will be appreciated that collimation of the laser in this way will typically be done in the factory at the time of manufacture and at service intervals.

The laser is a low power semiconductor which requires low voltage D.C. electrical power and therefore can be powered by batteries. The battery for powering both the laser and the stepper motor is housed in the compartment as previously discussed, and is connected, through control means to the stepper motor and the laser. Connection of the battery, control means, laser and motor is by electrical cables via slip rings and brushes, in a manner that is within the skill of the skilled addressee.

The stepper motor is used to drive rotation of the laser assembly and is housed in a cavity in the barrel portion of the head assembly. The motor is connected directly to the laser assembly as described previously. This direct connection allows for greater control of the dither of the laser assembly when compared to other indirect drives such as belt drive and cog or gear drive mechanisms. The separation of the laser from the motor and the power source means that the weight carried in the laser assembly is minimised which in turn eases the load experienced by the drive means during rotating of the laser assembly. As such when the laser assembly is rotated at varying and relatively high speeds and dithered within an arc, a relatively low inertia is experienced as a result of the reduced weight of the laser assembly. The laser assembly is rotatable at variable speeds between 0 and 450 r.p.m. Whilst a stepper motor is discussed it will be appreciated that other motors may be used.

In this embodiment a stepper motor is used but it will be appreciated that other motors may be used as desired. For example, a D.C. chopper motor could be used where the rotor of the motor includes a vane which interrupts a light beam of a photo-diode and photo-transistor arrangement and upon interruption the polarity of the D.C. voltage to the motor is reversed thereby effecting a reversal in rotation direction.

Figure 16:
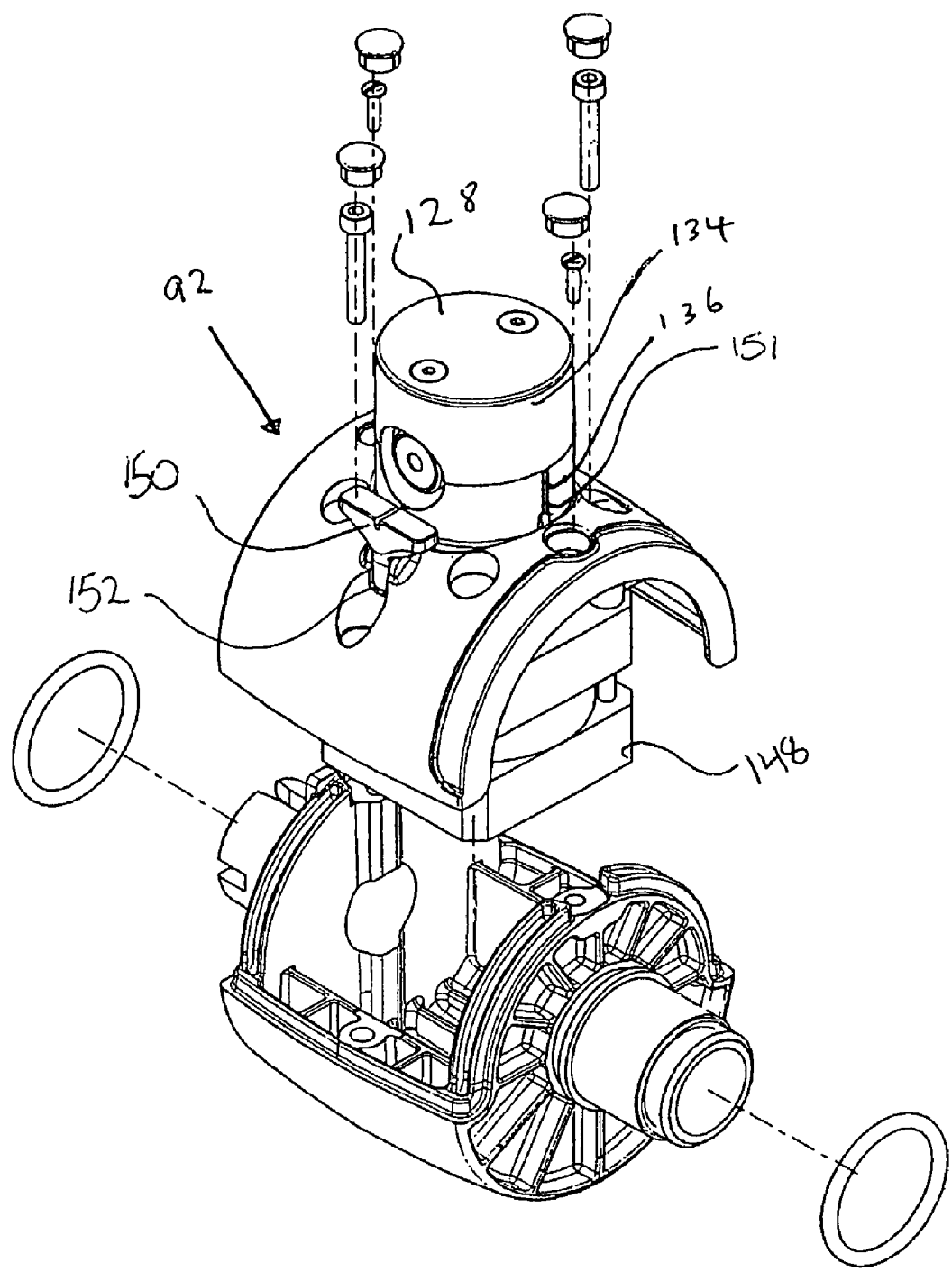
FIG. 16 is an exploded isometric view of a barrel section of a head assembly.

The laser assembly also includes a locking pin (150) which engages slots (151) spaced at 90 degree intervals around the laser assembly (see FIG. 16). The pin also engages a corresponding slot (152) in the barrel assembly. The pin contains a radial protrusion that engages slots (152) when inserted fully into the barrel assembly, but disengages slots (152) when lifted out of the barrel assembly. This enables manual stepped quadrant rotation of the laser assembly so that it can be quickly and accurately be rotated to 0, 90, 180 and 270 degree positions. This allows the laser beam to be accurately rotated through 180 degrees for example to transfer the beam position form the floor to ceiling or form side to side.

The control means includes circuitry for controlling power to the laser and also control and drive circuitry for the motor. Switches for control of the laser and the stepper motor are mounted on a side of the body so as to be externally accessible. These switches are not shown but take a form known in the art. Suitable cabling connects the switches to the control circuit board.

The control circuit board also includes a receiver means which in conjunction with a remote control device allows for remote control of the apparatus.

In high ambient light levels, such as outdoors, it can be difficult to see the laser beam and therefore the apparatus may be used in conjunction with a detector for detecting the laser beam, as is known in the art.

An alternative head assembly collimation means is illustrated in FIGS. 18 through 22 which allows for coarser adjustment that collimation means (40). The alternative head assembly collimation is built into a pedestal (160) onto which the head is supported.

The pedestal is made in two parts an upper part (161) and a lower part (162). The upper part includes two upwardly extending arms (163, 164) that support the bearings into which are journalled shaft (98) for rotation of the head. The lower part of the pedestal is fastened to the body (14) by screws (165). The tilt of the upper part can be adjusted relative to the lower part along two axes.

Between the two halves of the pedestal are positioned two balls, a fixed ball (170) and an adjustable ball (171). The adjustable ball is held within a cup shaped seat (172) in the lower part of the pedestal and in the cup shaped portion of a ball adjustment screw (173). The ball adjustment screw is threaded to the upper portion of the pedestal so that on turning the front to back tilt can be adjusted with the fixed ball providing the pivot axis.

Two side adjustment screws (174, 175) on either side of an axis that might be drawn between the two balls which in the illustration is central between the two upwardly extending arms (163, 164). These are screw threaded into the upper part of the pedestal, so that turning of these can set the side to side tilt of the pedestal about a pivot being provided by both balls. Four locking screws (two are shown at 176, 177) extends through the upper part of the pedestal and secure to the lower part to lock the two together in their collimated positions.

The invention claimed is:

1. A laser levelling apparatus including a platform, a base assembly, a body assembly, a head assembly and a laser assembly, the body assembly rotatable about a body axis relative to the base assembly, the head assembly rotatably supported by the body and rotatable about a head assembly axis transverse to the body axis, the laser assembly supported by the head assembly and rotatable about a laser assembly axis which is transverse the head assembly axis, the laser assembly having a laser diode and focussing elements and laser collimating means to collimate the laser beam with the laser assembly, the head assembly mounted between a first shaft end mounted at a first position of the body and a second shaft end mounted at a second position of the body opposed to the first position, and a head assembly collimating means to adjust the axis of rotation of the head assembly, and base assembly levelling means to adjust the level of the base relative to the platform in at least two transverse directions, wherein the base levelling, laser collimating means and head assembly collimating means together provide for collimation of the beam along three orthogonal axes.

2. A laser levelling apparatus as in claim 1 wherein the body is supported on the base assembly on a planar surface.

3. A laser levelling apparatus as in claim 2 wherein a machined lower surface of the body sits on a machined upper surface of the base so that the body can rotate relative thereto with substantially no relative tilting.

4. A laser levelling apparatus as in claim 3 wherein the machined surface extends adjacent to a periphery of the body.

5. A laser levelling apparatus as in claim 1 wherein the base assembly is supported on the platform through a central pivotal connection and the base levelling means cooperates between the platform and the base assembly to allow adjustment of the height of the base relative to the platform in two orthogonal directions.

6. A laser levelling apparatus as in claim 5 wherein the base levelling means includes two or more height adjustable feet which extend between and engage the platform and the base assembly so that adjustment of the height of one or more of the feet results in tilting of the base relative to the platform.

7. A laser levelling apparatus as in claim 5 wherein the base levelling means is positioned at or adjacent the periphery of the body.

8. A laser levelling apparatus as in claim 1 wherein the laser assembly includes a laser body having an internal cavity into which the laser is fitted so as to project the laser beam outwardly from the body, the laser assembly collimation means may include an elastomeric bearing fitted between the cavity and an outer surface of the laser so as to hold the laser in place within the cavity, the elastomeric bearing being located toward one end of the laser and one or more screws altering the distance between the laser body and the laser at the other end of the laser to alter the orientation of the laser with respect to the laser assembly body.

9. A laser levelling apparatus as in claim 1 wherein the first shaft end and the second shaft end of the head assembly are mounted on the body to be non-diametrically opposed.

10. A laser levelling apparatus as in claim 9 wherein the head assembly is rotatable through 180 degrees between a first position so that the plane of rotation of the laser is in line with the axis of rotation of the body and a second configuration in which the plane of rotation of the laser is parallel to the axis of rotation of the body and outside of the periphery of the body.

11. A laser levelling apparatus as in claim 10 wherein the platform, body, and base contain mutually aligned central bores, the laser being non diametrical with respect of the body such that on the head being positioned downwardly centrally of the body, the laser is aligned with the central bore to allow projection of the laser beam down the centre of the apparatus.

12. A laser levelling apparatus as in claim 10 wherein sides of the body being cut-away so that when said laser is aligned in said first position transmission of the laser is possible at least down to a horizontal position with respect of the centre of the sides without interference by the body of the apparatus.

13. A laser levelling apparatus as in claim 12 wherein the cutaway of the body is such that transmission of the laser is down below a horizontal position.

14. A laser levelling apparatus as in claim 1 wherein a first end of the head assembly may also contain a head assembly locking means for accurately locking the head assembly in 0, 90, and 180 degree positions.

15. A laser levelling apparatus as in claim 1 wherein the apparatus includes laser locking means for accurately locking the laser assembly in 0, 90, 180 and 270 degree positions.

16. A laser levelling apparatus as in claim 15 wherein the head assembly includes rotational collimating means for rotating the head assembly relative to the body to thereby rotate the head assembly axis relative to the body and the quadrant locking means.

17. A laser levelling apparatus as in claim 1 wherein the apparatus also includes drive means for driving rotation of the laser assembly around the laser assembly axis.

18. A laser levelling apparatus as in claim 17 wherein the drive means drives the laser assembly directly.

\* \* \* \* \*